United States Patent
Wunderlich et al.

(10) Patent No.: US 9,587,317 B2
(45) Date of Patent: Mar. 7, 2017

(54) METHOD FOR THE MANUFACTURE OF A COMPONENT FOR HIGH THERMAL LOADS, A COMPONENT PRODUCIBLE BY THIS METHOD AND AN AIRCRAFT ENGINE PROVIDED WITH THE COMPONENT

(75) Inventors: Thomas Wunderlich, Rangsdorf (DE); Dan Roth-Fagaraseanu, Stahnsdorf (DE); Susanne Schruefer, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1083 days.

(21) Appl. No.: 13/588,133

(22) Filed: Aug. 17, 2012

(65) Prior Publication Data

US 2013/0045093 A1 Feb. 21, 2013

(30) Foreign Application Priority Data

Aug. 17, 2011 (DE) .................. 10 2011 081 112

(51) Int. Cl.
*B23K 26/32* (2014.01)
*F01D 25/00* (2006.01)
(Continued)

(52) U.S. Cl.
CPC ............ *C23C 24/10* (2013.01); *B22F 3/1055* (2013.01); *B22F 7/04* (2013.01); *B23K 26/32* (2013.01);
(Continued)

(58) Field of Classification Search
CPC ......... F05D 2260/941; F05D 2230/233; F05D 2230/234; F05D 2230/236; F01D 9/02;
(Continued)

(56) References Cited

U.S. PATENT DOCUMENTS 2,327,839 A 8/1943 Zschokke
4,485,630 A * 12/1984 Kenworthy ............ B23P 15/00
416/97 R
(Continued)

FOREIGN PATENT DOCUMENTS

DE 10008861 9/2001
DE 10056617 5/2002
(Continued)

OTHER PUBLICATIONS

Eurpoean Search Report dated Dec. 20, 2012 for corresponding European patent application.

*Primary Examiner* — Craig Kim
*Assistant Examiner* — Danielle M Christensen
(74) *Attorney, Agent, or Firm* — Timothy J. Klima; Shuttleworth & Ingersoll, PLC

(57) ABSTRACT

A method for manufacturing a thermally deformable component for high thermal loads, includes: providing a first area of the component with a first metallic material by a generative laser process, or making the first area of the first metallic material; providing a second area of the component with a second metallic material by a generative laser process, or making the second area of the second metallic material; where at least one of the metallic materials is deposited by the generative laser process, and a ratio of a linear expansion coefficient $\alpha_1$ of the first metallic material and of a linear expansion coefficient $\alpha_2$ of the second metallic material is as:

$$\frac{\alpha_2(T_2)}{\alpha_1(T_1)} = x \frac{|T_1 - T_0|}{|T_2 - T_0|},$$

(Continued)

where x=0.5 to 1; $T_1$=mean operating temperature on a hot side; $T_0$=reference temperature; $T_2$=mean operating temperature on a cold side.

19 Claims, 3 Drawing Sheets

(51) Int. Cl.
| | |
|---|---|
| C23C 24/10 | (2006.01) |
| B22F 3/105 | (2006.01) |
| B22F 7/04 | (2006.01) |
| C23C 26/00 | (2006.01) |
| B23K 35/30 | (2006.01) |
| B23K 35/36 | (2006.01) |
| B23K 35/02 | (2006.01) |
| C22C 19/05 | (2006.01) |

(52) U.S. Cl.
CPC ........ *B23K 26/342* (2015.10); *B23K 35/0244* (2013.01); *B23K 35/3033* (2013.01); *B23K 35/361* (2013.01); *B23K 35/3607* (2013.01); *C22C 19/055* (2013.01); *C22C 19/056* (2013.01); *C22C 19/057* (2013.01); *C23C 26/00* (2013.01); *F01D 25/005* (2013.01); *B23K 2201/006* (2013.01); *B23K 2203/08* (2013.01); *B23K 2203/18* (2013.01); *B23K 2203/26* (2015.10); *B23K 2203/50* (2015.10); *Y02P 10/295* (2015.11)

(58) Field of Classification Search
CPC ........ F01D 9/041; F01D 25/005; F01D 25/12; F01D 5/08; F23R 3/002; F23R 2900/00005; F23R 2900/00018
USPC .......................................... 60/800, 755, 757
See application file for complete search history.

(56) References Cited

U.S. PATENT DOCUMENTS

| | | |
|---|---|---|
| 5,912,087 A | 6/1999 | Jackson et al. |
| 6,001,492 A | 12/1999 | Jackson et al. |
| 6,821,656 B2 | 11/2004 | Dietrich et al. |
| 2003/0148148 A1 | 8/2003 | Dietrich et al. |
| 2005/0268998 A1 | 12/2005 | Bostanjoglo et al. |
| 2006/0054079 A1* | 3/2006 | Withey ................ C30B 29/02 117/108 |
| 2007/0084047 A1 | 4/2007 | Lange et al. |
| 2008/0138647 A1* | 6/2008 | Jiang ...................... C23C 10/52 428/630 |
| 2009/0028697 A1 | 1/2009 | Shi et al. |
| 2009/0098394 A1* | 4/2009 | Skoog ..................... C23C 26/00 428/450 |
| 2010/0227198 A1 | 9/2010 | Lampenscherf |
| 2011/0135840 A1 | 6/2011 | Doye et al. |
| 2011/0268584 A1* | 11/2011 | Mittendorf ............. C30B 11/00 416/97 R |

FOREIGN PATENT DOCUMENTS

| | | |
|---|---|---|
| DE | 10319494 | 11/2004 |
| DE | 102006013215 | 10/2007 |
| EP | 0242100 | 10/1987 |
| EP | 1539465 | 6/2005 |
| EP | 1620225 | 2/2006 |
| EP | 1743729 | 1/2007 |
| EP | 2025777 | 2/2009 |
| EP | 2039884 | 3/2009 |
| EP | 2090752 | 8/2009 |
| EP | 2123862 | 11/2009 |
| WO | 0191924 | 12/2001 |
| WO | 2009156316 | 12/2009 |

\* cited by examiner

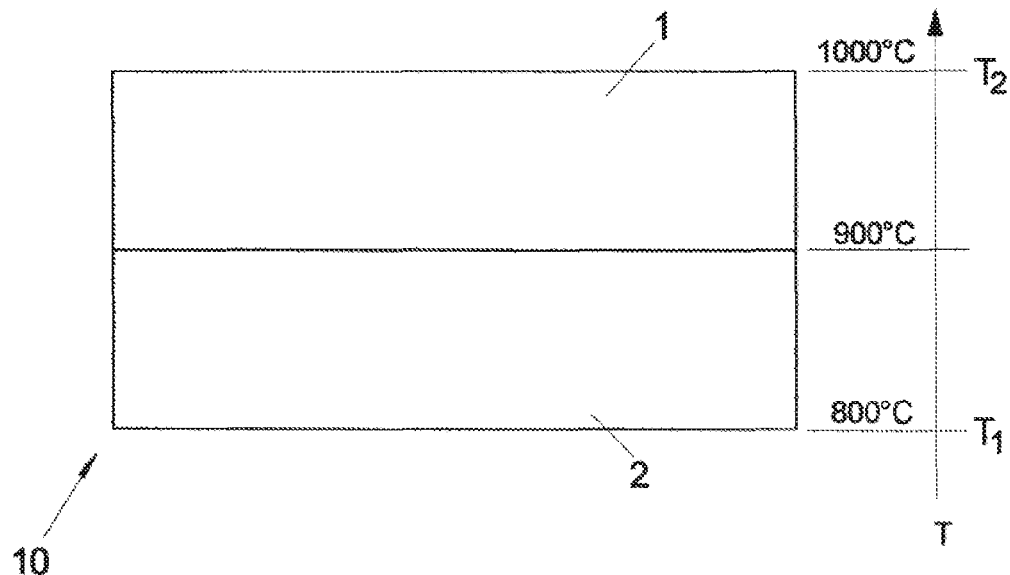
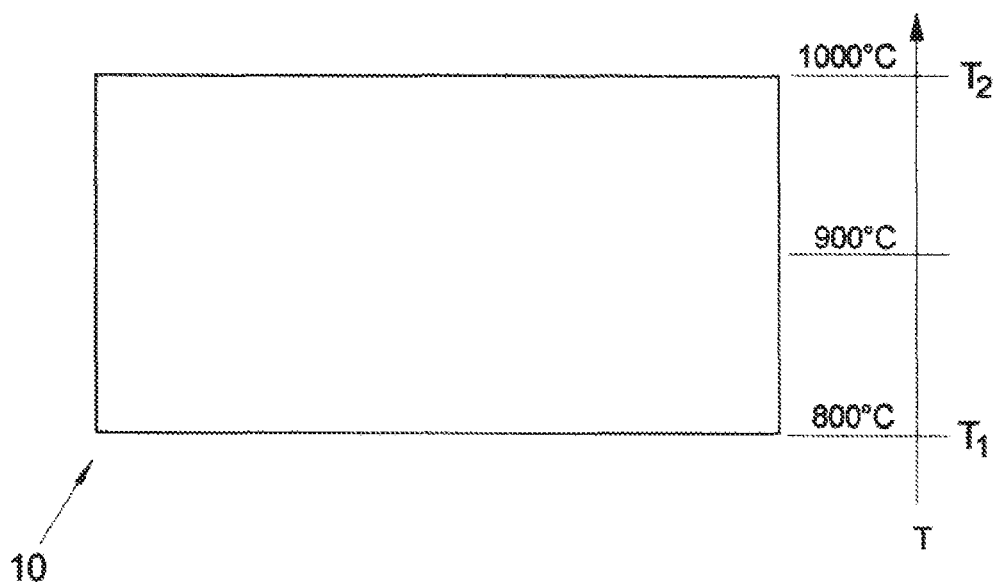

METHOD FOR THE MANUFACTURE OF A COMPONENT FOR HIGH THERMAL LOADS, A COMPONENT PRODUCIBLE BY THIS METHOD AND AN AIRCRAFT ENGINE PROVIDED WITH THE COMPONENT

CROSS-REFERENCE TO RELATED APPLICATION

This application claims the benefit of German Patent Application No. 102011081112.5 filed on Aug. 17, 2011, the entirety of which is fully incorporated herein by reference.

BACKGROUND

This invention relates to a method for the manufacture of a component for high thermal loads, a component producible by this method, and an aircraft engine provided with the component.

In many engineering fields, components are exposed to high temperatures and temperature gradients. In most cases, these components are exposed to hot gases, for example combustion gases in furnaces, heaters or also aircraft engines. In addition to the direct stresses on the material from the temperature itself, the result is deformations in particular due to temperature gradients in the components.

From EP 2 090 752 A2 and EP 2 025 777 A2, for example, components are known which are designed in a specific way for high temperatures.

SUMMARY

The object underlying the present invention is to find improved solutions for these types of components.

A method for manufacturing a thermally deformable component for high thermal loads has the following steps here:

a) a first area of the component is provided with a first metallic material, or the first area is made of the first metallic material, b) a second area of the component is provided with a second metallic material, or the second area of the component is made of the second metallic material, c) where at least one of the metallic materials is deposited by a generative laser process, and d) the following applies for the ratio of the linear expansion $\alpha_1$ of the first metallic material and of the linear expansion coefficient $\alpha_2$ of the second metallic material:

$$\frac{\alpha_2(T_2)}{\alpha_1(T_1)} = x \frac{|T_1 - T_0|}{|T_2 - T_0|},$$

where x=0.5 to 1; and
$T_1$=mean operating temperature on the hot side of the first area
$T_0$=reference temperature, in particular room temperature or a higher temperature
$T_2$=mean operating temperature on the cold side of the second area.

By a targeted selection of the thermal expansion coefficients in two component areas (for example layers placed one above the other), the properties of the component can be selectively influenced, where the deposition of materials by generative laser processes further increases this flexibility, since components with complex geometries and/or components with a particularly targeted material selection can be manufactured. The selection of the ratio of the linear expansion coefficients ensures that no excessive deformations result in a component.

Advantageous embodiments for generative laser processes include selective laser melting, laser cladding, selective laser sintering and/or direct laser deposition. The methods can be used individually or also in combination.

It can also be advantageous when in one embodiment at least one area is designed as a casting. This enables the economic efficiency of casting processes to be exploited.

Advantageous embodiments for the first material use nickel alloys such as Ni-12Cr-6Al-4Mo-0.7Ti (example: INCONEL® 713), Ni-15Cr-10Co-8Mo-4.2Al-3.6Ti (example: C1023), Ni-10Co-10W-9Cr-5.5Al-2.5Mo-1.5Ti (example: MAR-M 246®), Ni-10Co-10W-8.3Cr-5.5Al-3Ta-1Ti-0.7Mo (example: MAR-M 247®), Ni-15Co-9.5Cr-5.5Al-4.7Ti-3Mo-1V (example: INCONEL® 100) and Ni-9.6Co-6.5Ta-4.6Cr-6.4W-5.6Al-3Re-1Ti (example: CMSX4®) and intermetallic phases from the group of aluminides or suicides. Advantageous embodiments for the second material feature a nickel-based alloy, in particular Ni-20Cr-20Co-6Mo-2Ti (example: C263) and/or 43.5Ni/Co-16.5Cr-3.3Mo-1.2Al-1.2Ti (example: PE16).

An advantageous embodiment is also achieved when the component has a sequence of areas i=16, . . . N, where the following applies for adjacent areas (for example layers):

$$\frac{\alpha_{i-1}(T_{i+1})}{\alpha_i(T_i)} = x \frac{|T_i - T_0|}{|T_{i+1} - T_0|}$$

The i-th area is that which is on the warmer side relative to the i+1-th area.

The linear expansion coefficients $\alpha_i$, $\alpha_{i+1}$ of adjacent layers are thus matched to one another in a certain way such that deformations of the component are reduced. As a result, layer structures can be manufactured where the thicknesses of the layers can be designed equal or also selectively differing. The generative laser processes allow considerable design latitude here.

A particularly advantageous embodiment of the method applies when a cooling structure is built up on the component by a generative laser process, in particular selective laser sintering or selective laser melting. The generative laser processes allow the components, and hence also the cooling structures, to assume complex shapes, which can have a positive effect on the cooling efficiency. The areas of differing metallic materials matched to one another do not necessarily have to be applied using generative laser processes: it is possible for example to use castings too.

It is also advantageous if in one embodiment the following applies for the ratio of the thermal conductivities $\lambda_1$, $\lambda_2$:

$$\frac{\lambda_1(T)}{\lambda_2(T)} = K,$$

where K=0.2 to 1.5 for conductivities at room temperature (T=RT) and K≤1.5 for conductivities at mean operating temperature T at the boundary surface or in the transition area between the two layers.

It is furthermore advantageous to increase the concentration of elements with high thermal conductivity and high linear expansion coefficient, in particular the concentration of copper and/or aluminum, in the metallic material of the second area (i.e. of the area which is cooler relative to the first area) of an embodiment. This allows targeted and local influencing of the properties of the component.

It is also advantageous when the first area and/or the second area is subjected to heat treatment and/or to hot isostatic pressing. The heat treatment is used for setting the mechanical properties. Hot isostatic pressing is used in particular for compression in the case of sintered materials.

When a multi-material system is used, a boundary surface or transition area between the metallic materials advantageously forms between the first area and the second area.

The object is also achieved by a component. The component has at least two areas of metallic materials, where the following applies for the ratio of the linear expansion coefficient $\alpha_1$ of the first metallic material and of the linear expansion coefficient $\alpha_2$ of the second metallic material:

$$\frac{\alpha_2(T_2)}{\alpha_1(T_1)} = x \frac{|T_1 - T_0|}{|T_2 - T_0|},$$

where x=0.5 to 1, and $T_1$: mean operating temperature on the hot side of the first area $T_0$: reference temperature, in particular room temperature or a higher temperature $T_2$: mean operating temperature on the cold side of the second area.

An advantageous embodiment of the component has a sequence of areas i=1, . . . N, where the following applies for adjacent areas:

$$\frac{\alpha_{i+1}(T_{i+1})}{\alpha_i(T_i)} = x \frac{|T_i - T_0|}{|T_{i+1} - T_0|}$$

The i-th area is that which is on the warmer side relative to the i+1-th area.

It is particularly advantageous when the component is designed as a thermally highly loadable lining element with a cooling structure, as a part in the inlet area of a turbine, on a static part of a turbine, in particular a stator vane and/or on walls of the turbine, as a heat shield and/or as a lining of a combustion chamber.

It is furthermore advantageous when the following applies for the ratio of the thermal conductivities $\lambda_1$, $\lambda_2$:

$$\frac{\lambda_1}{\lambda_2} = K,$$

where K=0.2 to 1.5 for conductivities at room temperature and K≤1.5 for conductivities at mean operating temperature $T_1$ on the hot side of the component.

A further advantageous embodiment applies when the concentration of elements with high thermal conductivity and high linear expansion coefficient is increased in the metallic material of the second area, in particular the concentration of copper and/or aluminum.

An advantageous embodiment has a cooling structure.

Furthermore, an advantageous embodiment of a component has a first area and the second area between which is arranged a boundary surface or a transition area between the metallic materials.

The problem is also solved by an aircraft engine provided with a component according to an embodiment of the invention, where the component is arranged in particular in the inlet area of the turbine, on a static element of the turbine, in particular a stator vane and/or on walls of the turbine, as a heat shield and/or a lining of a combustion chamber.

BRIEF DESCRIPTION OF THE DRAWINGS

In the following, the present invention is described in greater detail in light of the figures of the accompanying drawing showing several exemplary embodiments.

FIG. 3A shows a schematic representation of a multi-material system.

FIG. 3B (Prior Art) shows a schematic representation of a single-material system.

DETAILED DESCRIPTION

Figure 1A:
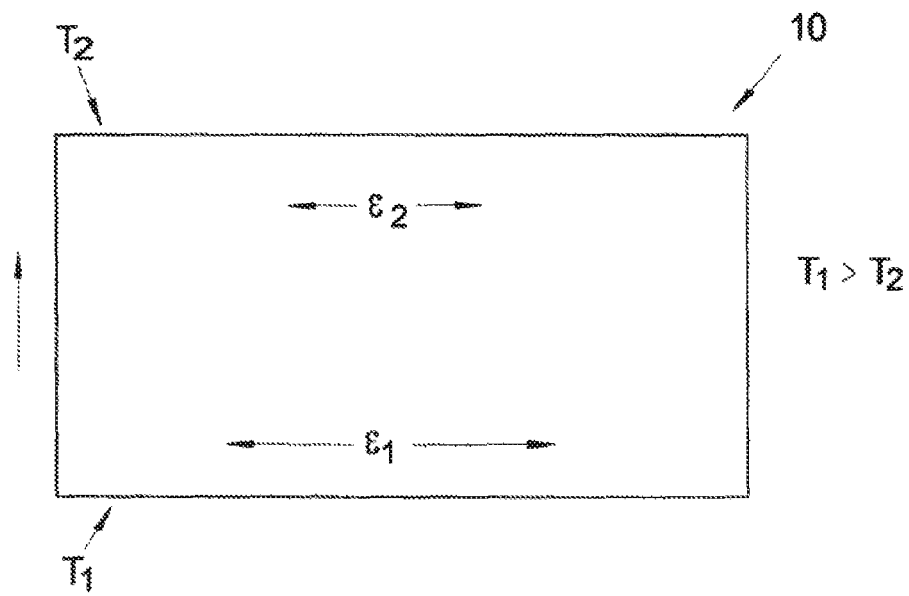
FIG. 1A (Prior Art) shows a schematic representation of a component in accordance with the state of the art made from one metallic material.

FIG. 1A (Prior Art) shows schematically a component 10 in the form of a cuboid and made from one metallic material. The component 10 is subjected on its bottom side to a relatively high temperature T1, and on its upper side to a lower temperature T2. There is thus a temperature gradient in the arrow direction, i.e. the heat flows from the bottom side to the upper side of the component 10.

Since the component 10 is made homogeneously from one metallic material, the linear expansion coefficient α in the component 10 of the material is dependent solely on the temperature and rises as the temperature increases.

Due to the locally differing heating up (in particular due to the temperature gradient), the material of the component 10 however expands differently in the various areas, i.e. there are locally differing expansions $\epsilon_1$, $\epsilon_2$. In the hotter area of $T_1$ (i.e. the bottom side of the component 10), the expansion $\epsilon_1$ is greater than in the cooler area of $T_2$ (i.e. at the upper side of the component 10), i.e. the expansion $\epsilon_2$ is lower. Due to these expansions, the bottom side of the component 10 (i.e. the hot side) is thus under compressive stress, and the upper side of the component (i.e. the cold side) under tensile stress. In FIG. 1 the expansions are indicated by arrows. Longer arrows represent a greater expansion.

The component 10 is generally deformable and not rigid under thermal load, i.e. it is not installed in such a way that deformation is not possible, for example. The differing expansions $\epsilon_1$, $\epsilon_2$ lead to the component 10 changing its geometrical shape, which is unwelcome. In this embodiment, the primary concern is therefore not the change in the internal stress distribution, but geometrical accuracy particularly under high thermal loads.

Figure 1B:
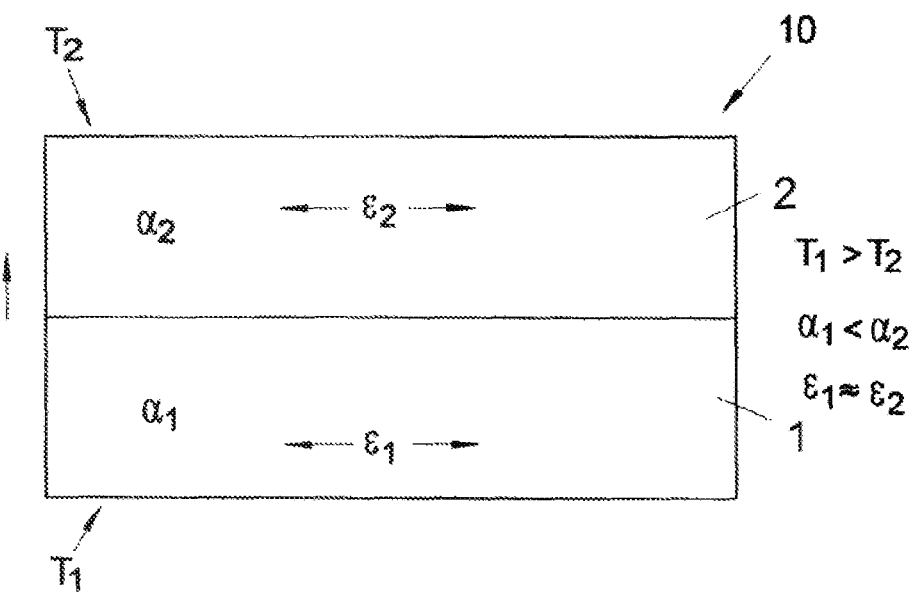
FIG. 1B shows a schematic representation of a component in accordance with an embodiment of the present invention, made from two different metallic materials.

FIG. 1B shows in an embodiment how deformations can be reduced or even prevented. To do so, the component 10 is built up of areas 1, 2 with two metallic materials.

The temperature gradient again acts, as shown in connection with FIG. 1A, from the bottom side to the upper side. A lower area 1 of the component 10 facing the higher temperature $T_1$ has a metallic material with a lower linear expansion coefficient $\alpha_1$ than the upper area 2 facing the lower temperature $T_2$: $\alpha_1 < \alpha_2$.

This means that the lower area 1, here designed as a layer 1, cannot expand as much relatively as the upper area 2, likewise designed as a layer. By suitable matching of the materials and of the corresponding thermal expansion coefficients $\alpha_1$, $\alpha_2$, it can be achieved that the expansions $\epsilon_1$, $\epsilon_2$ in the lower and upper layers approximate to one another or are even about equal, so that deformation of the component 10 is reduced or prevented. Furthermore, there are possibilities for cost savings when less expensive materials can be used for the cooler areas of the component 10 under certain circumstances.

Advantageous embodiments can be provided for determining the linear expansion coefficients $\alpha 1$, $\alpha 2$ in the areas 1, 2. The following applies as a general principle:

$$\alpha_1(T_1) \times (T_1 - T_0) = \epsilon_1$$

$$\alpha_2(T_2) \times (T_2 - T_0) = \epsilon_2$$

The expansions $\epsilon_1$, $\epsilon_2$ thus depend on the temperature differences over the areas 1, 2 of the component 10 and on the linear expansion coefficients $\alpha_1$, $\alpha_2$. The temperature $T_0$ is a reference temperature which can for example be the room temperature or a higher temperature.

If the expansions $\epsilon_1$, $\epsilon_2$ in the areas 1, 2 of the component 10 are to be matched to one another, this can be achieved with the following condition:

$$\frac{\alpha_2(T_2)}{\alpha_1(T_1)} = x \frac{|T_1 - T_0|}{|T_2 - T_0|},$$

where x is between 0.5 and 1. The temperatures $T_1$, $T_2$ must be understood here as mean temperatures in operation. $T_0$ is a reference temperature.

If during design the temperatures $T_1$, $T_2$, $T_0$ of a component 10 are known and a factor x is selected, material pairs with suitable thermal expansion coefficients can be selected so that the deformations of the component 10 are reduced.

An embodiment is described in more detail in the following on the basis of a numerical example and FIG. 3A and FIG. 3B (Prior Art).

Here a multi-material system with two components and a clear-cut transition at the boundary surface (case 1, FIG. 3A) is compared with a single-material system (case 2, FIG. 3B (Prior Art)).

In the present case, the multi-material system features INCONEL® 100 on the hotter side, and C 263 on the cooler side. The single-material system has INCONEL® 100 all the way through.

In the present case, the temperature on the cooler side should be 800° C., and on the hotter side 1000° C. The temperature is 900° C. at the boundary surface between the two material systems.

When a boundary surface is mentioned here, this can in other embodiments also be a transition area between two material systems. It is thus possible, in particular when powders are Lased, that mixing occurs, so that in the finished component 10 no firm boundary surface exists. It is also possible that in another embodiment, a connecting layer (for example a braze layer) is arranged between two material areas 1, 2. Room temperature is assumed here as the reference temperature $T_0$.

| Material 1: INCONEL ® 100 | Material 1 = material 2: |
| Material 2: C263 | INCONEL ® 100 |
|---|---|
| $\alpha_1(1000°$ C.) = 1.6E-5 1/K | $\alpha_1(1000°$ C.) = 1.6E-5 1/K |
| $\alpha_2(800°$ C.) = 1.7E-5 1/K | $\alpha_1(900°$ C.) = 1.5E-5 1/K |
| $\alpha_1(900°$ C.) = 1.5E-5 1/K | $\alpha_1(800°$ C.) = 1.4E-5 1/K |
| $\alpha_2(900°$ C.) = 1.8E-5 1/K | |

The thermal expansions are calculated as follows:

| Case 1: hot side | Case 2: hot side |
|---|---|
| $\epsilon_1 = \alpha_1(1000°$ C.) × (1000° C. − 21° C.) = 1.6E-2 | $\epsilon_1 = \alpha_1(1000°$ C.) × (1000° C. − 21° C.) = 1.6E-2 |
| Case 1: boundary surface | Case 2: boundary surface |
| $\epsilon_1 = \alpha_1(900°$ C.) × (900° C. − 21° C.) = 1.3E-2 | $\epsilon_1 = \alpha_1(900°$ C.) × (900° C. − 21° C.) = 1.3E-2 |
| $\epsilon_2 = \alpha_2(900°$ C.) × (900° C. − 21° C.) = 1.6E-2 | |
| Case 1: cold side | Case 2: cold side |
| $\epsilon_2 = \alpha_2(800°$ C.) × (800° C. − 21° C.) = 1.3E-2 | $\epsilon_1 = \alpha_1(800°$ C.) × (800° C. − 21° C.) = 1.1E-2 |

This makes clear that in the case of the multi-material system the difference in the expansions ($\epsilon_1 - \epsilon_2$) is at 0.3 E-2 less than in the case of the single-material system (0.5 E-2). This shows that the selected material system in case 1 is geometrically more accurate than the system according to case 2. However, the example also shows that shear stresses occur in the area of the boundary surface.

The value x from the equation for the ratio of the linear expansion coefficients is 0.85.

Alternatively or additionally, material pairs can be specified on the basis of conditions for the conductivity $\lambda$. At room temperature, the following applies:

$$\frac{\lambda_1}{\lambda_2} = y,$$

where y=0.2 to 1.5. $\lambda_1$ is the thermal conductivity of the first area 1 of the component 10 (hot side), $\lambda_2$ is the thermal conductivity of the second area 2 of the component 10 (cold side). Furthermore, the following applies for a typical mean operating temperature $T_1$ of an aircraft turbine:

$$\frac{\lambda_1}{\lambda_2} = z,$$

where $z \leq 1.5$.

The metallic material of the first layer 1 can be, for example: Ni-12Cr-6Al-4Mo-0.7Ti (example: INCONEL® 713), Ni-15Cr-10Co-8Mo-4.2Al-3.6Ti (example: C1023), Ni-10Co-10W-9Cr-5.5Al-2.5Mo-1.5Ti (example: MAR-M 2460), Ni-10Co-10W-8.3Cr-5.5Al-3Ta-1Ti-0.7Mo (example: MAR-M2470), Ni-15Co-9.5Cr-5.5Al-4.7Ti-3Mo-1V (example: INCONEL® 100) and Ni-9.6Co-6.5Ta-4.6Cr-6.4W-5.6Al-3Re-1Ti (example: CMSX4®) as well as intermetallic phases from the group of aluminides or silicides. Advantageous embodiments for the second material have a nickel-based alloy, in particular Ni-20Cr-20Co-6Mo-2Ti (example: 0263) and/or 43.5Ni/Co-16.5Cr-3.3Mo-1.2Al-1.2Ti (PE16).

Advantageous pairs of materials are in particular also:

| Hot side (first layer 1) | Cold side (second layer 2) |
|---|---|
| Ni—10Co—10W—9Cr—5.5Al—2.5Mo—1.5Ti | Ni—20Cr—20Co—6Mo—2Ti |
| Ni—15Co—9.5Cr—5.5Al—4.7Ti—3Mo—1V | Ni—20Cr—20Co—6Mo—2Ti |
| Ni—9.6Co—6.5Ta—4.6Cr—6.4W—5.6Al—3Re—1Ti | Ni—20Cr—20Co—6Mo—2Ti |

In further embodiments, elements with high heat conductance and thermal expansion can be selectively used in the cold second area 2. An example for this is copper and/or aluminum. Increasing the concentration of these metals in the second area 2 also achieves a reduction in the deformations.

In a further embodiment of the method, a heat treatment and/or hot isostatic pressing follows the application of the first area 1 and/or of the second area 2.

FIG. 1B shows, for reasons of clarity, a component 10 with two areas 1, 2 (as layers). In alternative embodiments, the component 10 has a layer structure having a sequence of areas with metallic materials, where the linear expansion coefficients meet the following conditions relatively to one another:

$$\frac{\alpha_{i+1}(T_{i+1})}{\alpha_i(T_i)} = x \frac{|T_i - T_0|}{|T_{i+1} - T_0|}$$

Hence a finer graduation of the material properties is possible with more than two areas (i=2, 3, 4, 5 . . . ).

In these ways, it is for example possible to build up a kind of layer structure with three or more areas 1, 2 of differing materials. It is not essential here that the thickness of the layers is identical over the entire layer system. In any event, the result is a layer system with graduated properties, i.e. properties matched to one another.

FIG. 1B shows two areas 1, 2 of which the material properties are matched to one another. All areas 1, 2 here can be built up by a generative laser process. Alternatively, at least one first area 1, 2 can represent a substrate that is for example a casting. The second area 2, 1 can then be applied to this substrate using a generative laser process. With this embodiment, the material properties (in particular the expansion coefficients) of the casting and the applied area must then be matched to one another according to the above statements.

The illustration in FIG. 1B represents the schematic structure of a double layer applied by generative laser processes.

The generative laser processes include in particular laser cladding, selective laser sintering (SLS), selective laser melting (SLM) and direct laser deposition (DLD).

The methods can also be combined for the manufacture of components. In all cases, metallic layers are generated by laser radiation on a substrate.

With laser cladding, components 10 can be built up with graduated layer systems, so that properties such as the thermal expansion coefficient α and the heat conductance can be selectively set locally. The layers are built up by melting of the material in question (in powder form or as a wire). It is thus possible to precisely apply layers with thicknesses between 0.1 mm and several centimeters. The applied material here forms a bond with the substrate underneath it. Further advantages are that a wide range of materials can be applied and the heat input into the substrate itself is relatively low. However, no undercuts can be manufactured using this method.

With selective laser sintering, a spatial structure is manufactured by sintering from a powder-like starting material. With the layer-by-layer build-up of the layers by selective melting of the powder by a laser from the powder bed, components with undercuts can also be obtained here. If during melting of the powder-like material no bonding agents are used, but instead the metallic powder is completely melted on, this is called selective laser melting.

It is thus possible in particular to combine selective laser sintering and laser cladding with one another. The combination is particularly useful when different strengths of the methods have to be exploited. In laser cladding, it is relatively easy to change the materials since the powder is blown onto the welding point. With this method however, complex component geometries are difficult to manufacture. By contrast, with laser sintering complex component geometries are easily producible, but the change of material is more difficult, since the powder is in the form of a bed. Hence both methods are complementary.

Figure 2:
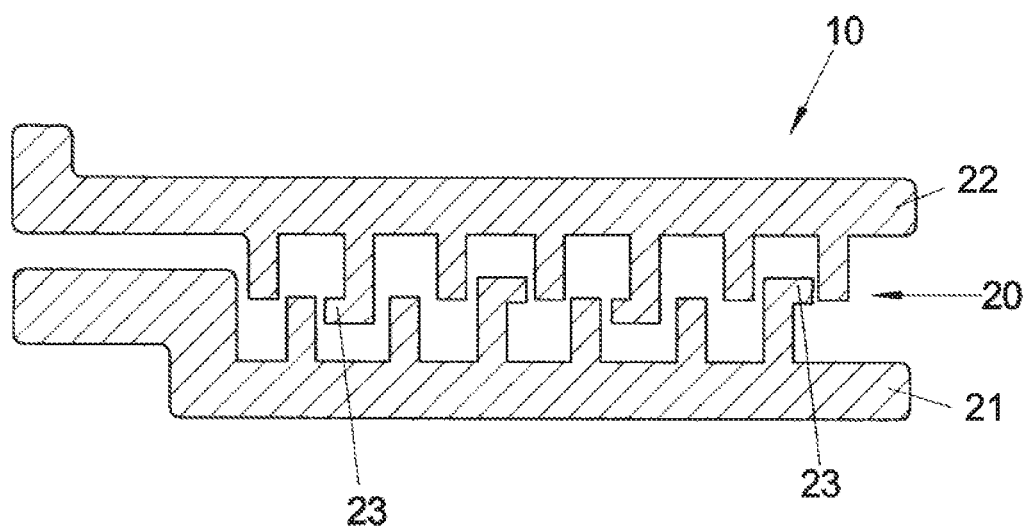
FIG. 2 shows a sectional view through an embodiment of a component having a cooling structure.

FIG. 2 shows in schematic form the cross-section through a component 10 that has a cooling structure 20 with a complex geometry. The cooling structure 20 here has a first element 21 and a second element 22, with cooling gas flowing through the space in between. The elements 21, 22 are connected to one another in areas not shown in FIG. 2, so that a temperature gradient over the component 10 also leads to a deformation of the component 10.

The details of the cooling structure 20 have for example undercuts 23 which can be efficiently manufactured by the generative laser processes.

The hot temperature $T_1$ applies on the bottom side of the component 10, the first element 21, and the temperature $T_2$ which is cooler relatively thereto on the upper side, the second element. Hence the first element 21 represents the first area 1, the second element 22 the second area 2. For the linear expansion coefficients $\alpha_1$, $\alpha_2$, the relationship obtained in connection with FIG. 1B applies.

LIST OF REFERENCE NUMERALS

1 First area of the component
2 Second area of the component
10 Component
20 Cooling structure
21 First element of the cooling structure
22 Second element of the cooling structure
23 Undercut on cooling structure
$T_0$ Reference temperature (e.g.: room temperature)
$T_1$ Temperature on the bottom side of the component
$T_2$ Temperature on the upper side of the component
$\alpha_1$ Linear thermal expansion coefficient, first area
$\alpha_2$ Linear thermal expansion coefficient, second area
$\epsilon_1$ Expansion of lower (hot side) layer
$\epsilon_2$ Expansion of upper (cold side) layer

What is claimed is as follows:

1. A method for manufacturing a thermally deformable component for high thermal loads, comprising:
   a) providing that a first area on a first side of the component exposed to a first mean operating temperature is provided with or made of a first metallic material,
   b) providing that a second area on a second side of the component exposed to a second mean operating temperature is provided with or made of a second metallic material, wherein the first mean operating temperature is higher than the second mean operating temperature,
   c) providing that at least one of the first and second metallic materials is deposited by a generative laser process, and
   d) wherein, a ratio of the linear expansion coefficient $\alpha_1$ of the first metallic material and of the linear expansion coefficient $\alpha_2$ of the second metallic material is as follows:

$$\frac{\alpha_2(T_2)}{\alpha_1(T_1)} = x \frac{|T_1 - T_0|}{|T_2 - T_0|},$$

where x is a range$\geq 0.5$ and $\leq 1$; and
$T_1$ is the first mean operating temperature;
$T_0$ is a reference temperature$\geq$room temperature; and
$T_2$ is the second mean operating temperature.

2. The method in accordance with claim 1, wherein the generative laser processes include at least one of selective laser melting, laser cladding, selective laser sintering or direct laser deposition.

3. The method in accordance with claim 1, and further comprising providing that one of the first and second metallic materials not deposited by a generative laser process is a casting.

4. The method in accordance with claim 1, wherein the first material is selected from a group consisting of Ni-12Cr-6Al-4Mo-0.7Ti, Ni-15Cr-10Co-8Mo-4.2Al-3.6Ti, Ni-10Co-10W-9Cr-5.5Al-2.5Mo-1.5Ti, Ni-10Co-10W-8.3Cr-5.5Al-3Ta-1Ti-0.7Mo, Ni-15Co-9.5Cr-5.5Al-4.7Ti-3Mo-1V; Ni-9.6Co-6.5Ta-4.6Cr-6.4W-5.6Al-3Re-1Ti, as well as intermetallic phases from the group of aluminides and silicides.

5. The method in accordance with claim 1, wherein the second material is selected from a group consisting of Ni-20Cr-20Co-6Mo-2Ti and 43.5Ni/Co-16.5Cr-3.3Mo-1.2Al-1.2Ti.

6. The method in accordance with claim 1, and providing the component a sequence of areas i=1, . . . N, where for adjacent areas, a following equation applies:

$$\frac{\alpha_{i+1}(T_{i+1})}{\alpha_i(T_i)} = x \frac{|T_i - T_0|}{|T_{i+1} - T_0|}.$$

7. The method in accordance with claim 1, and building up a cooling element on the component by at least one chosen from selective laser sintering and selective laser melting.

8. The method in accordance with claim 1, wherein a ratio of thermal conductivities $\lambda_1$, $\lambda_2$ is as follows:

$$\frac{\lambda_1(T)}{\lambda_2(T)} = K,$$

where K=0.2 to 1.5 for conductivities at room temperature and K$\leq$1.5 for conductivities at the first mean operating temperature $T_1$ at the first side of the component.

9. The method in accordance with claim 1, and providing that the metallic material of the second area includes a concentration of at least one chosen from copper and aluminum.

10. The method in accordance with claim 1, wherein, after application of metallic material to at least one of the first area or the second area, performing at least one of heat treating or hot isostatic pressing on the component.

11. The method in accordance with claim 1, and forming at least one of a boundary surface or transition area between the metallic materials between the first area and the second area.

12. A component produced by the method in accordance with claim 1, comprising a sequence of areas i=1, . . . N, including:
   the first area of the first metallic material; and
   the second area of the second metallic material;
   where adjacent areas of the sequence of areas follow:

$$\frac{\alpha_{i+1}(T_{i+1})}{\alpha_i(T_i)} = x \frac{|T_i - T_0|}{|T_{i+1} - T_0|}.$$

13. The component in accordance with claim 12, wherein the component is at least one chosen from a component in an inlet area of a turbine, a stator vane of the turbine, a wall of the turbine, a heat shield, a lining element with a cooling structure and a lining of a combustion chamber.

14. The component in accordance with claim 12, wherein under a thermal load with a temperature gradient, a difference between a thermal expansion $\epsilon_1$ of the first metallic material on the first side of the component and the thermal expansion $\epsilon_2$ of the second metallic material on the second side of the component is reduced as compared with a component made from only one of the first and second metallic materials.

15. The component in accordance with claim 12, wherein ratio of thermal conductivities $\lambda_1$, $\lambda_2$ is as follows:

$$\frac{\lambda_1}{\lambda_2} = K,$$

where K=0.2 to 1.5 for conductivities at room temperature, and K$\leq$1.5 for conductivities at the first mean operating temperature $T_1$ on the first side of the component.

16. The component in accordance with claim 12, wherein the metallic material of the second area includes a concentration of at least one chosen from copper or aluminum.

17. The component in accordance with claim 12, further comprising a cooling structure.

18. The component in accordance with claim 12, wherein between the first area and the second area, at least one of a boundary surface or a transition area between the metallic materials is provided.

19. An aircraft engine provided with a component according to claim 12, where the component is arranged in at least one chosen from an inlet area of a turbine, a stator vane of the turbine, a wall of the turbine, a heat shield and a lining of a combustion chamber.

* * * * *